United States Patent Office 3,536,652
Patented Oct. 27, 1970

3,536,652
EXTENDER OIL AMORPHOUS POLYPROPYLENE BLEND FOR COMPOUNDING ETHYLENE-PROPYLENE RUBBER
Frederic W. Bickel, Burbank, and Gerald H. Peterson, Santa Monica, Calif., assignors, by mesne assignments, to McDonnell Douglas Corporation, Santa Monica, Calif., a corporation of Maryland
No Drawing. Continuation-in-part of application Ser. No. 468,570, June 30, 1965. This application July 6, 1965, Ser. No. 469,878
Int. Cl. C08f 45/28
U.S. Cl. 260—33.6           6 Claims This application is a continuation-in-part of our copending application Ser. No. 468,570, filed June 30, 1965.

The instant invention relates to a novel composition or blend of an extender oil for ethylene-propylene rubber, and is particularly concerned with a blend or mixture consisting essentially of a hydrocarbon extender oil for an ethylene-propylene copolymer or an ethylene-propylene terpolymer rubber component, and a material soluble therein and which functions as a tackifier for ethylene-propylene rubber, said blend being adapted for addition to an ethylene-propylene uncured rubber composition to substantially increase the tackiness of such rubber, and to provide ethylene-propylene rubber blends having suitable viscosity for processing while permitting the use of higher molecular weight ethylene-propylene rubbers together with substantial amounts of extender oil.

Ethylene-propylene rubbers are now well known materials. A typical ethylene-propylene copolymer rubber can be manufactured by copolymerization of ethylene and propylene, by passing ethylene and propylene gases into normal hexane in which the necessary catalysts are in solution. A typical catalyst system can contain vanadium oxychloride and triethyl aluminum chloride, the proportions of which may be varied to produce polymers of various molecular stereospecificities. The copolymerization is carried out in the absence of any moisture. Atmospheric or moderately elevated pressures and normal room temperature are suitable. During the course of copolymerization, the system becomes thick and viscous. The thick, viscous reaction mixture is washed with water to remove the catalyst and the solvent is removed by flashing.

More recently, ethylene-propylene terpolymer rubbers have been developed which are produced by polymerization of ethylene, propylene and a small amount of a third monomer. Such third monomer is generally a diene, and can be a conjugated or non-conjugated straight chain diene, or a non-conjugated cyclic diene. Examples of such straight chain conjugated dienes are 1,3-butadiene and isoprene, and examples of the non-conjugated dienes are dicyclopentadiene, 2-methylenenorbornene, 11-ethyl-1,11-tridecadiene, and 2-(2'-ethyl-2'-butenyl)norbornene. The ethylene-propylene-diene terpolymer can be obtained, for example, by introducing the diene, e.g., 11-ethyl-1, 11-tridecadiene, into a solvent such as tetrachloroethylene, and then introducing ethylene and propylene gases into the solution containing catalyst, for examples, a combination of aluminum triisobutyl and vanadium oxychloride. The precipitated polymer is washed with methanol and acetone, and is then dried. In such terpolymer rubbers the mole percent of the diene component is substantially less than the mole percent of either ethylene or propylene.

Typical ethylene-propylene copolymer or terpolymer rubbers can contain, for example, about 40 to about 60 mole percent ethylene and about 60 to about 40 mole percent propylene. In a typical ethylene-propylene terpolymer rubber, about 0.1 to about 1.0 mole of diene monomer per kilogram of copolymer, can be employed. The molecular weight of the ethylene-propylene copolymer or terpolymer can range from about 100,000 up to as high as 4,000,000 or more, particularly in the case of the terpolymer. The ethylene-propylene polymers of intermediate molecular weight are those which have a molecular weight ranging from about 1,000,000 to about 1,500,000 and have a corresponding Mooney viscosity in the range of about 135 to about 150. The lower molecular weight polymers, e.g., having a molecular weight of less than 1,000,000 and the above noted intermediate molecular weight polymers, are those which have found widest use in industry. The higher molecular weight ethylene-propylene polymers are generally considered to be those having a molecular weight of at least about 2,000,000, for example, ranging from about 2,000,000 to over 4,000,000. Such higher molecular weight polymers have a Mooney viscosity ranging from about 175 to substantially above 200.

Both the ethylene-propylene copolymer and terpolymer rubbers are relatively inexpensive rubbers and have excellent physical properties which render them highly useful for industrial purposes. For example, these polymers have excellent high temperature resistance, abrasion resistance, ozone and oxygen resistance, weathering and age resistance, and resilience, and have low hysteresis loss. In general, these rubbers have a combination of properties rendering them exceedingly useful in making automobile tires, except for the fact that they lack the degree of tackiness which is required in the process of manufacturing tires.

In the manufacture of tires, in accordance with conventional procedure, strips of rubber covered cord are applied in laminar fashion to a form to produce the carcass, and in so doing it is important that each layer be securely bonded to each adjoining layer without inclusion of air bubbles or pockets. In the next step in the manufacture of tires, a breaker strip is applied to the previously formed carcass. At this step, it is also important that a secure bonding be achieved with no air pockets. Finally, the sidewall and tread are applied and it is again important that a secure bonding be achieved with no air pockets. In each of these stages uncured rubber compound is employed, and to achieve good bonding and to eliminate air pockets, it has been recognized that the uncured rubber compound should be a tacky rubber compound which if not tacky will not bond well to adjoining layers and will leave air pockets. The term "tack" or "tackiness" is understood to mean the characteristic of rubber which causes two fresh surfaces thereof to adhere or coalesce. This property is of critical importance in the manufacture of tires.

Ethylene-propylene-rubbers, including both the copolymers and terpolymers described above, as provided heretofore, have lacked tackiness and therefore have not been adapted readily to the manufacture of tires. By the term "ethylene-propylene rubber" or "ethylene-propylene rubbers" is meant both ethylene-propylene copolymer rubbers and ethylene-propylene terpolymer rubbers as described above.

In the copending application of Frederic W. Bickel et al., Ser. No. 421,727, filed Dec. 28, 1964, there is described and claimed the incorporation of amorphous polypropylene, into ethylene-propylene rubbers to substantially increase the tackiness of the uncured rubber composition.

Ethylene-propylene rubbers can be processed in the pure state, but it has been common practice to extend such polymers with extender oils. Oil extension of ethylene-propylene polymers, particularly ethylene-propylene terpolymers during manufacture has certain advantages including, for example, the avoidance of costly and long mixing cycles, and produce polymers superior in various respects to commercially available unextended rubbers. Although the incorporation of such extender oils into the ethylene-propylene polymers provides a certain degree of increased tack, the level of tack provided by the oils alone, however, is insufficient for those applications, particularly the manufacture of tires, requiring a high degree of tack.

The higher molecular weight ethylene-propylene polymers such as those having a molecular weight in excess of about 2,000,000, when compounded, yield rubbers of superior properties such as high tensile strength. However, these polymers are difficult to process even when large amounts of extender oil are incorporated, and this problem is further complicated by the fact that regardless as to the amount of extender oil which is added to such higher polymers, as previously noted, such rubbers have insufficient tack for important applications such as tire manufacturing.

One object of the invention is to provide a composition consisting essentially of an extender oil and a tackifying agent, preferably in certain relative proportions, and which is particularly adapted for addition to an uncured ethylene-propylene rubber, for readily processing such uncured rubber and increasing the tackiness thereof, and resulting in a cured rubber of good physical properties comparable to a cured rubber produced without employing such tackifying agent.

Another object of the invention is the provision of a blend consisting essentially of a hydrocarbon extender oil and a tackifier for ethylene-propylene rubber, said tackifier being soluble in said oil, and which can be added to an uncured ethylene-propylene rubber in the form of either a low or a high molecular weight ethylene-propylene copolymer or terpolymer, to produce an uncured rubber blend having a viscosity such that the resulting oil extended rubber blend is readily processible, yet has substantial tackiness, and which can be cured to produce a rubber having good strength, elongation and hardness characteristics.

Other objects and advantages of the invention will appear hereinafter.

We have unexpectedly found that a composition or blend consisting essentially of an extender oil for ethylene-propylene rubber, and amorphous polypropylene is particularly effective when added to an uncured ethylene-propylene rubber, to provide an uncured ethylene-propylene rubber blend having a Mooney viscosity rendering the blend readily processible while substantially increasing the tackiness of the uncured rubber composition over that of the tackiness of the same composition in the absence of the polypropylene. Further, it has also surprisingly been found that such blend of polypropylene and extender oil is effective on addition to an uncured ethylene-propylene polymer, particularly a high molecular weight ethylene-propylene polymer, such as the terpolymer to provide an uncured rubber composition having substantially reduced nerviness, and the resulting cured rubber has good physical properties including good tensile strength, as compared to a rubber produced from a similar rubber blend but excluding polypropylene.

It was particularly surprising and unexpected that although the amorphous polypropylene goes into solution in the extender oil, the effectiveness of the polypropylene in increasing the tackiness of the ethylene-propylene rubber when incorporated therein as a solution of the polypropylene in the extender oil, is not reduced, as compared to the effectiveness of polypropylene as a tackifier when added directly to the ethylene-propylene rubber, and in the absence of the extender oil. Thus, it was unobvious to find that the above noted blend consisting essentially of polypropylene and extender oil when added to an ethylene-propylene rubber, whether of low, intermediate or high molecular weight, can function to reduce the viscosity of the resulting uncured ethylene-propylene rubber blend, substantially increase the tackiness of the uncured ethylene-propylene rubber, and reduce the nerviness of the rubber, and provide a cured ethylene-propylene rubber of good physical properties, without impairment of any of the desirable properties conferred by the components of the blend of polypropylene and extender oil when added separately to the uncured ethylene-propylene rubber. For example, a given amount of the polypropylene when added in solution in the extender oil to the uncured ethylene-propylene rubber, increases the tackiness of the ethylene-propylene rubber substantially to the same degree as is imparted by the same amount of polypropylene when added separately to ethylene-propylene rubber and in the absence of the extender oil. In addition, the combination of extender oil and amorphous polypropylene reduces the nerviness of the uncured ethylene-propylene rubber, and also the relative proportions of polypropylene and extender oil in the blend can be balanced to impart the desired viscosity to the uncured ethylene-propylene rubber composition to obtain facile processibility thereof, as described in greater detail hereinafter.

As an additional feature of the invention, the blend consisting essentially of amorphous polypropylene and extender oil, containing certain proportions of the polypropylene with respect to the extender oil is provided, so that such blend can be added directly to the ethylene-propylene polymer in the essentially pure state to provide readily and directly an uncured ethylene-propylene rubber blend containing the proper proportions of polypropylene and extender oil with respect to the ethylene-propylene polymer, without the necessity of incorporating any additional amounts of polypropylene or extender oil. Thus, the mixture of polypropylene in extender oil noted above can be stored ready for incorporation into the uncured ethylene-propylene polymer when required, to provide the proper blend of uncured ethylene-propylene rubber according to the invention without the danger of miscalculation of amounts and avoiding additional mixing and handling.

The incorporation of the blend of amorphous polypropylene and extender oil into the uncured ethylene-propylene rubber has several advantages. In the first place, it permits the use of high molecular weight ethylene-propylene polymers which produce superior cured rubbers, but which heretofore have been difficult to process either in the pure state or in the oil extended condition. Further, the presence of the polypropylene in solution in the extender oil permits the use of substantially larger amounts of extender oil with a given amount of ethylene-propylene rubber and therefore enhances the economics of the production of these rubbers. As previously indicated, the effectiveness of the polypropylene as a tackifier for the uncured ethylene-propylene rubber is not reduced by the presence of the relatively large amounts of extender oil, and the physical characteristics of the resulting cured rubber are not adversely affected to any significant degree by the presence of either the polypropylene or the extender oil. In summary, the addition of the blend of amorphous polypropylene and extender oil to uncured ethylene-propylene rubbers permits the use of higher molecular weight ethylene-propylene polymers ranging from a molecular weight of about 2,000,000 to over 4,000,000 to produce a polymer mixture or blend of enhanced tackiness extended with oil in substantial amounts, and having reduced nerviness characteristics and having a Mooney viscosity, e.g., of the order of about 50 to about 70, rendering the blend readily processible into cured finished rubber products exhibiting good strength properties.

Polypropylenes suitable for incorporation in an extender oil to produce a blend of these two components according to the invention, are amorphous polypropylenes which can vary from a liquid to a semi-solid or solid, e.g., of wax-like consistency, and can range in molecular weight from about 300 to about 25,000. Preferred polypropylenes for purposes of the invention are those in solid waxy form, and having a molecular weight range from about 5,000 to about 25,000. The polypropylenes are known materials generally produced by catalytic polymerization of propylene derived, for example, from a petroleum hydrocarbon source, in the presence of catalysts such as titanium trichloride and aluminum or lithium alkyls. A typical process for producing such polypropylenes is described in Journal of Polymer Science Part C, No. 1, pp. 237–279 (1963)—"Ziegler Polymerization of Olefins" by J. Boor, Jr.

The polypropylenes are generally soluble in benzene, ethyl ether, petroleum and coal tar distillates, and chlorinated hydrocarbons, and insoluble in ethyl and isopropyl alcohols, acetone and most highly polar solvents. Examples of commercially available forms of polypropylenes suitable for incorporation into the extender oil to provide a blend according to the invention, particularly adapted for use in an ethylene-propylene rubber, are the liquid amorphous polypropylene marketed as "Amopol C–175" or "Polypropene C–175," and the solid waxy amorphous polypropylene marketed as "Oronite Polypropylene." If desired, a blend of the solid and liquid forms of amorphous polypropylene can also be used. The terms "polypropylene" and "polypropene" are used interchangeably in the art to denote the same material, which is described above.

The extender oil used for preparing the blend consisting essentially of polypropylene and extender oil according to the invention, can be an oil of paraffinic, napthenic or aromatic character. These oils can be characterized generally as hydrocarbon extender oils, particularly adapted for ethylene-propylene polymers, usually obtained from a petroleum source. The paraffinic oils which can be employed as extenders can have an aniline point range of about 189 to about 240° F., the naphthenic extender oils from about 150 to about 250° F., and the aromatic extender oils from about 100 to about 130° F. These extender oils are marketed generally as the "Flexons" by Enjay Chemical Company, and the paraffinic, naphthenic, and aromatic oils are marketed as the "Sunpar," "Sunthene" and "Sundex" oils, respectively, by Sun Oil company.

The properties of a representative group of the "Flexon" hydrocarbon extender oils is set forth below:

The relative proportions of polypropylene and hydrocarbon extender oil incorporated in the blend of these two components according to the invention are adjusted so that when such blend is added to the uncured ethylene-propylene polymer, the polypropylene and extender oil together are present in an amount sufficient to reduce the Mooney viscosity of the resulting uncured rubber composition containing ethylene-propylene polymer, so that the resulting composition is processable. This is usually achieved when said amount is such that the Mooney viscosity of such composition is between about 50 and about 70, as noted above. Thus, for example, where the polypropylene extender oil blend is to be incorporated with a lower molecular ethylene-propylene polymer, e.g., one having a molecular weight less than about 2,000,000, a smaller proportion of polypropylene is usually required with a given amount of extender oil, to obtain such workable viscosity in the resulting uncured ethylene-propylene rubber composition while retaining tackiness. Where the polypropylene extender oil blend is to be incorporated with a higher molecular weight ethylene-propylene polymer, e.g., having a molecular weight substantially greater than 2,000,000, a larger proportion of polypropylene is usually employed with such given amount of extender oil to achieve the above noted workable viscosity in the resulting uncured ethylene-propylene rubber composition while imparting tackiness to the composition. Thus, the polypropylene functions in conjunction with the extender oil in the blend of these two components to adjust and to reduce the Mooney viscosity of the ethylene-propylene polymer to which such blend is added, and the relative proportions of polypropylene and extender oil are balanced to provide with the ethylene-propylene polymer a processible uncured rubber composition, while imparting substantial tackiness thereto, but without significant adverse effect on the physical properties of the cured rubber.

The amount of the two-component blend of polypropylene and hydrocarbon extender oil added to the ethylene-propylene polymer preferably is such that polypropylene tackifier is present in the uncured rubber composition in an amount which can range from about 2.5 to about 50 parts, usually about 5 to about 50 parts, of propylene, to 100 parts of the polymer, by weight, and the extender oil is present in such uncured rubber composition in an

| Type of oil | Aromatic, Flexon 391 | Naphthenic, Flexon 680 | Paraffinic, Flexon 865 |
|---|---|---|---|
| Viscosity, SSU: | | | |
| At 100° F | 4,010 | 1,250 | 332 |
| At 210° F | 90 | 76 | 55 |
| Gravity, API at 60° F | 13.7 | 21.6 | 30.6 |
| Aniline point, °F | 120 | 204 | 233 |
| Clay/silica gel analysis (wt. percent): | | | |
| Aromatics | 66.5 | 36.8 | 21.0 |
| Saturates | 30.5 | 63.2 | 77.8 |
| Polar compounds | 3.0 | 0.0 | 1.2 |

The properties of another representative group of hydrocarbon extender oils are noted below:

| Type of oil | Aromatic- Sundex 8180 | Naphthenic- Sunthene 2100 | Paraffinic- Sunpar 140 |
|---|---|---|---|
| Viscosity, SSU: | | | |
| At 100° F | 15,000 | 1,001 | 404 |
| At 210° F | 176 | 68.4 | 58 |
| API gravity at 60° F | 11.8 | 23.2 | 29.6 |
| Specific gravity at 60° F | .987 | .915 | .878 |
| Flash, open cup °F | 470 | 450 | 460 |
| Fire, °F | 540 | 490 | 520 |
| Pour point, °F | +60 | +10 | 0 |
| Color, ASTM | 1.5 | 1.25 | 1.5 |
| Ultraviolet absorptivity at 260 mμ | | 1.0 | .89 |
| Molecular weight | 415 | 420 | 485 |
| Aniline point, °F | 123 | 206 | 232 |
| Viscosity-gravity constant | .927 | .845 | .805 |
| Clay-gel analysis, wt. percent: | | | |
| Asphaltenes | .06 | 0.0 | 0 |
| Polar compounds | 11.40 | 1.0 | 0.7 |
| Aromatics | 68.40 | 22.2 | 16.1 |
| Saturates | 20.14 | 76.5 | 83.2 |
| Silica-gel aromatics, wt. percent | 81.5 | 25.2 | 15.5 |
| Refractive index at 68° F | 1.5547 | 1.4983 | 1.4811 | amount of at least about 10 parts, usually at least about 50 parts, and preferably at least about 100 parts for processing high molecular weight ethylene-propylene rubbers, e.g., having a molecular weight of about 2,000,000 or more, based on 100 parts by weight of such rubbers.

Accordingly, the proportions of polypropylene and extender oil in the blend of the invention are arranged so that the addition of a certain proportion of such blend to the ethylene-propylene polymer will automatically provide an oil extended polymer mixture containing polypropylene, with all the components present in the proper proportions noted above for producing a processible oil-polymer blend of about 50 to about 70 Mooney viscosity. For this purpose, such blend of the invention can contain, for example, about 5 to about 80 parts of polypropylene per 100 parts of extender oil, usually about 5 to about 50 parts of polypropylene, per 100 parts of extender oil. The amorphous polypropylene when used in liquid or solid form is miscible with and soluble in the hydrocarbon oil extender in the ranges of proportions noted above.

According to the invention, a higher molecular weight ethylene-propylene terpolymer can be employed, e.g., having a molecular weight of between about 2,000,000 and about 2,500,000 and having a Mooney viscosity of between about 175 and about 200, and by adding to the polymer a blend of 100 parts of "Flexon 391" and 10 parts of amorphous polypropylene, per 100 parts of ethylene-propylene terpolymer, a workable Mooney viscosity of between about 50 and 60 is achieved for the blend, and this uncured rubber blend loaded with carbon black has substantial tackiness suitable for tire manufacture, and resulting in a cured rubber having a tensile strength comparable to that of the cured rubber produced from the same uncured rubber noted above, but in the absence of polypropylene. Thus, a higher molecular weight polymer can be employed and the polypropylene of the polypropylene-extender oil blend of the invention functions in conjunction with the extender oil therein to provide an uncured rubber composition of workable viscosity, while the effectiveness of the polypropylene as a tackifier is maintained, without impairing the properties of the cured rubber.

A further feature of the invention is that additional quantities of extender oils furnished by the polypropylene-extender oil blend of the invention can be added to the very high molecular weight ethylene-propylene polymers, e.g., having a molecular weight of about 3,000,000 to about 4,500,000, in the presence of polypropylene, which are capable of being formulated into useful rubber products. Thus, according to this feature of the invention, amounts substantially greater than 100 parts of extender oil per 100 parts ethylene-propylene polymer can be employed with high molecular weight polymers to provide processible uncured rubber blends by employing the invention composition of extender oil including polypropylene. For example, a blend containing from about 125 to about 200 or more parts of extender oil together with polypropylene can be employed, per 100 parts of such high molecular weight rubbers. However, processible oil-polymer blends can also be produced to advantage employing polypropylene-extender oil blends containing smaller amounts of extender oil together with polypropylene, in conjunction with intermediate molecular weight ethylene-propylene polymers such as polymers having a molecular weight of the order of about 2,000,000 and lower molecular weight polymers of the order of about 1,000,000 or less.

Various conventional additives can be incorporated in the ethylene-propylene rubber component containing the blend of polypropylene and extender oil of the invention in preparing the uncured or unvulcanized rubber compound. These include, for example, fillers, pigments, activators, accelerators, cross-linking agents or promotors, and plasticizers.

Fillers generally employed in rubber formulations are the carbon blacks. Any well known type of carbon black can be employed for incorporation in the ethylene-propylene rubber formulations containing the blend of polypropylene and extender oil of the invention, including furnace blacks, and channel blacks.

Pigments are also generally employed in rubber formulations, and such materials can also be incorporated in the ethylene-propylene uncured rubber formulation including the blend of extender oil and polypropylene of the invention. Such pigments include, for example, metal oxides such as zinc oxide, titanium dioxide, antimony oxide, magnesium oxide, calcium oxide, lead oxide, and other pigments such as calcium carbonate, barium sulfate, zinc sulfide, talc, and the like.

Accelerators can also be employed in the ethylene-propylene rubber formulation including the blend of polypropylene and extender oil of the invention. Such accelerators can include any of the well known types of accelerators such as carbamates, thiazoles, aldehyde-amines, sulfenamides, and thiuram sulfides, e.g., the monosulfide, disulfide or tetrasulfide.

Cross-linking systems for curing the ethylene-propylene rubber including the blend of polypropylene and extender oil of the invention, include in addition to the above noted accelerators, a cross-linking agent. Thus, for example, sulfur is a well known cross-linking agent or vulcanizer for this purpose. However, in place of sulfur there can be employed as cross-linking agent a peroxide such as benzoyl peroxide, di-tertiary butyl peroxide, dicumyl peroxide, and the like.

If desired, plasticizers also can be incorporated in the rubber formulation including the blend of polypropylene and extender oil of the invention. Such plasticizers include, for example, polyethers such as the glycol polyethers, polyesters such as the dialkyl phthalates, e.g., dibutyl or dioctyl phthalate, and phosphate esters such as tricresyl phosphate and dibutyl phenyl phosphate.

The blend consisting essentially of amorphous polypropylene and the hydrocarbon extender oil can be incorporated into the ethylene-propylene copolymer or terpolymer rubber, in any suitable manner. Thus, for example, the specific ethylene-propylene rubber polymer employed can be placed on a rubber mill to break the rubber down. The carbon black and the pigment, where employed, can be added and the resulting mixture blended thoroughly on the mill. Then the blend of amorphous polypropylene and extender oil of the invention, in suitable proportion can be blended into the mixture on the mill. Alternatively, the blend of the hydrocarbon oil extender and the amorphous polypropylene of the invention can be added to the ethylene-propylene copolymer or terpolymer on the mill before incorporation of carbon black and pigment, where the latter is employed. Following this, the cross-linking system including accelerator and cross-linking agent can be incorporated, and the entire mixture thoroughly blended on the mill, providing an uncured rubber formulation which has improved tackiness and which is particularly valuable in the manufacture of tires. During such blending on the rubber mill no heat is applied and cooling water is circulated in the rolls of the mill, so as to prevent any premature curing of the rubber before it is employed in the desired application. The resulting uncured rubber can be stored for several days without losing its desirable tacky properties.

In order to vulcanize or cure the above noted formulation after it has been employed in the manufacture of a part such as a rubber tire, the tire, for example, containing the adherent layers of uncured rubber compound according to the invention, is placed in a mold in a press and the part is molded under high pressure, e.g., of the order of 150 pounds per square inch, with the application of heat at temperatures, e.g., of the order of about 300° to about 325° F. to provide the proper cure.

The following are examples of blends of polypropylene and hydrocarbon extender oils according to the invention, all parts being given in terms of parts by weight:

|  | A | B | C | D | E | F |
|---|---|---|---|---|---|---|
| Naphthenic extender oil (Sunthene 2100) | 100 | 100 | 100 | 100 | 100 | 100 |
| Oronite polypropylene | 5 | 10 | 20 | 40 | 60 | 75 |

|  | G | H | I | J | K | L |
|---|---|---|---|---|---|---|
| Aromatic extender oil (Sundex 8180) | 100 | 100 | 100 | 100 | 100 | 100 |
| Oronite polypropylene | 5 | 10 | 20 | 40 | 60 | 75 |

|  | M | N | O | P | Q | R |
|---|---|---|---|---|---|---|
| Paraffinic extender oil (Sunpar 140) | 100 | 100 | 100 | 100 | 100 | 100 |
| Oronite polypropylene | 3 | 7 | 15 | 32 | 40 | 50 |
| Polypropylene C-175 | 2 | 3 | 5 | 8 | 20 | 25 |

In the above blends A to R the Oronite polypropylene employed is a solid waxy amorphous polypropylene having an average molecular weight of about 10,000. The polypropylene C-175 in blends M to R is in liquid form and has the following properties:

Property: Viscosity grade, C-175
Viscosity:
    SSU at 100° F. _____ 69,000
    Centistokes at 100° F. _____ 14,500
    SSU at 210° F. _____ 790
    Centistokes at 210° F. _____ 175
    Flask point ° F. _____ 450
Color:
    ASTM _____ 0.5
    Gardner scale _____ 1
Sp. gravity, 60/60° F. _____ 0.865
Ave. molecular weight _____ 1,120
Refractive index, $n_D^{20}$ _____ 1.4766
Pour point, ° F. _____ 30
Total chlorides, percent _____ 0.04

The properties of the respective extender oils in the above blends are given above.

The following are examples of incorporation of the above blends of polypropylene and extender oil of the invention in ethylene-propylene rubbers. In tests carried out employing the rubber formulations of the examples below, in the general procedure followed for testing the tackiness of the rubber formulations, a sheet of uncured rubber according to the formulations of the examples below is folded over on itself and a weight is placed thereon for a period of about 5 minutes. After this period the weight is removed and the two layers are pulled apart. The relative adhesion between such adjacent layers of rubber is determined by the amount of force necessary to pull the layers apart.

In each of the examples below the proportions of components are given in terms of parts by weight unless otherwise indicated.

EXAMPLE 1

The following two series of uncured rubber formulations are prepared, Series I being composed of compositions S, T, U and V, and Series II being composed of compositions W, X, Y and Z. Compositions V and Z of Series I and II are controls, neither of which contains any polypropylene. Compositions S, T, and U and Compositions W, X, and Y are prepared by adding the above blends, D, C and B, respectively, consisting essentially of amorphous polypropylene and extender oil, according to the invention, to 100 parts of the ethylene-propylene terpolymer, and mixing in the other additives in the manner described above. The properties of the cured rubbers produced from each of the compositions of these two series are also set forth below:

SERIES I
[Cure 30 minutes at 307° F.]

|  | S | T | U | V |
|---|---|---|---|---|
| Ethylene-propylene terpolymer | 100.00 | 100.00 | 100.00 | 100.00 |
| Naphthenic extender oil (Sunthene 2100) | 100.00 | 100.00 | 100.00 | 100.00 |
| Oronite polypropylene | 40.00 | 20.00 | 10.00 | |
| Furnace black (Philblack A) | 120.00 | 120.00 | 120.00 | 120.00 |
| Stearic acid | 2.00 | 2.00 | 2.00 | 2.00 |
| Zinc oxide | 10.00 | 10.00 | 10.00 | 10.00 |
| 2-mercaptobenzothiazole | 1.00 | 1.00 | 1.00 | 1.00 |
| Tetramethyl thiuram disulfide | 3.00 | 3.00 | 3.00 | 3.00 |
| Sulfur | 3.00 | 3.00 | 3.00 | 3.00 |
| Properties: |  |  |  |  |
|   Tensile strength, p.s.i. | 1,300 | 1,690 | 1,860 | 2,050 |
|   Elongation, percent | 330 | 365 | 400 | 400 |
|   Hardness, Shore A, pts | 54 | 56 | 56 | 56 |

SERIES II
[Cure 30 minutes at 307° F.]

|  | W | X | Y | Z |
|---|---|---|---|---|
| Ethylene-propylene terpolymer | 100.00 | 100.00 | 100.00 | 100.00 |
| Naphthenic extender oil (Sunthene 2100) | 100.00 | 100.00 | 100.00 | 100.00 |
| Oronite polypropylene | 40.00 | 20.00 | 10.00 | |
| Furnace black (United 65 SPF black) | 160.00 | 120.00 | 120.00 | 120.0 |
| Stearic acid | 2.00 | 2.00 | 2.00 | 2.00 |
| Zinc oxide | 10.00 | 10.00 | 10.00 | 10.00 |
| Naugatuck Accelerator 133 | 4.00 | 4.00 | 4.00 | 4.00 |
| Tetramethyl thiuram disulfide | 2.00 | 2.00 | 2.00 | 2.00 |
| Sulfur | 3.00 | 3.00 | 3.00 | 3.00 |
| Properties: |  |  |  |  |
|   Tensile strength, p.s.i. | 1,350 | 1,530 | 1,550 | 2,000 |
|   Elongation, percent | 240 | 270 | 290 | 325 |
|   Hardness, Shore A, pts | 68 | 63 | 62 | 62 |

The ethylene-propylene terpolymer employed in the above compositions has the following properties:

Molecular weight _____ Over 2,000,000.
Mooney viscosity _____ Over 200.
Resistance to:
    Weather _____ Excellent.
    Ozone _____ Do.
    Acids _____ Good to excellent.
    Bases _____ Do.
    Abrasion _____ Good.
    Tearing _____ Do.
    Steam _____ Excellent.
    Compression set _____ Good.
    Dynamic properties _____ Good to excellent.
    Color stability _____ Excellent.
    Electrical properties _____ Do.
    Tack _____ Poor.
    Cord adhesion _____ Do.
    Cure rate _____ Medium
    Oil loading _____ Excellent.
    Black loading _____ Do.
    Cold flow _____ Do.

The Naugatuck Accelerator 133 in the above formulations W, X, Y and Z is a proprietary accelerator believed to be a metal dithiocarbamate type accelerator.

The Mooney viscosity of the blend of ethylene-propylene terpolymer and extender oil in the control compositions V and Z is about 75. The mixtures of the ethylene-propylene terpolymer and the blends of polypropylene and extender oil (Compositions D, C and B), in the various other compositions of the two series of formulations above, ranges from about 50 to about 60.

Compositions S, T, U, W, X and Y, including the blends of polypropylene and extender oil according to the invention, are observed to have substantial and very desirable tackiness of the type which is necessary for tire manufacture, whereas Compositions V and Z, the controls, containing no polypropylene, have little or no tackiness. The tackiness of Compositions S, T, U, W, X and Y persists for several days, e.g., up to about 5 days.

It is also observed that Compositions S, T, U, W, X and Y, including the blend of both the extender oil in substantial amount together with polypropylene, are readily processible whereas the control Compositions V and Z containing extender oil but no polypropylene are more difficult to process. Further, the nerviness of the uncured rubber formulations including the blend of polypropylene and extender oil of the invention, S, T, U, W, X and Y, is substantially less than the nerviness of the uncured control formulations V and Z.

It is also noted that the cured rubbers produced from the uncured formulations S, T, U, W, X and Y, including the blend of polypropylene together with the extender oil, have acceptable and comparable properties of tensile strength elongation and hardness, to the cured rubbers produced from control Compositions V and Z in the absence of polypropylene, showing that the incorporation of the blend of polypropylene together with the extender oil, according to the invention, into the uncured ethylene-propylene rubber formulations does not adversely affect or degrade the acceptable quality of the resulting cured rubber.

EXAMPLE 2

An additional 50 parts of Sunthene 2100 naphthenic extender oil is added to each of the blends B, C and D before addition thereof to the ethylene-propylene terpolymer in each of the Compositions S, T, U, W, X and Y of Series I and II of Example 1, and 150 parts of Sunthene 2100 extender oil is employed in each of the control Compositions V and Z, so that there is present in each of the resulting mixtures 150 parts of extender oil per 100 parts of the ethylene-propylene terpolymer.

The Mooney viscosity of the mixtures of ethylene-propylene terpolymer and the blends of 150 parts of extender oil and the polypropylene of the invention, employed in the various uncured rubber compositions above, ranges from about 50 to about 60, and such compositions have good tack and reduced nerviness, and are easily processed. On the other hand, the tack of the blend of ethylene-propylene terpolymer and the 150 parts of extender oil, and containing no polypropylene, employed in the control compositions corresponding to Compositions V and Z above, is inadequate.

Also, the resulting rubbers produced from the above uncured compositions containing ethylene-propylene terpolymer and the blends of 150 parts of naphthenic oil extender and polypropylene of the invention, have good physical properties, including tensile strength, elongation and hardness, comparable to those of the cured rubbers produced from the corresponding control compositions containing no polypropylene.

EXAMPLE 3

Compositions corresponding to Compositions S to Z of Example 1 are prepared, except that the 100 parts of ethylene-propylene terpolymer in each of these compositions is replaced by 100 parts of Royalene 301X, and only 50 parts of the naphthenic extender oil "Sunthene 2100" is employed in each of the blends, B, C and D before addition of such blends to the Royalene 301X polymer to form the Compositions S, T, U, W, X and Y of Example 1, and 50 parts of Sunthene 2100 extender is employed in each of the control Compositions V and Z. Royalene 301X is an ethylene-propylene terpolymer of the same chemical composition as the ethylene-propylene terpolymer of the compositions of Example 1 above, but has a lower molecular weight of about 1,000,000 and a Mooney viscosity of about 130.

The Mooney viscosity of the mixtures of Royalene 301X and the blends of 50 parts of extender oil and the polypropylene of the invention, employed in the various uncured rubber compositions above, ranges from about 50 to about 70, and such compositions have good tack, reduced nerviness and are easily processed. The Mooney viscosity of the blend of Royalene 301X and the 50 parts of extender oil, and containing no polypropylene, employed in the control compositions corresponding to Compositions V and Z in Example 1 above, is above 70, i.e., about 90. Such control compositions have little or no tackiness and are difficult to process.

The resulting cured rubbers produced from the above compositions containing Royalene 301X terpolymer and the blends of 50 parts of naphthenic oil extender and polypropylene of the invention have comparable physical properties to those of the cured rubbers produced from the corresponding control compositions containing no polypropylene, similar to the comparisons in Example 1.

EXAMPLE 4

Compositions are prepared corresponding to Compositions S to Z of Example 1, except that the ethylene-propylene terpolymer is replaced in each of the compositions by 100 parts of ethylene-propylene copolymer having a molecular weight of about 1,000,000 and a Mooney viscosity of about 135, and a blend of 50 parts of naphthenic extender oil "Sunthene 2100" and 20 parts of the amorphous polypropylene, according to the invention is incorporated, employing only 50 parts of the Sunthene 2100 extender oil in the controls corresponding to Compositions V and Z of Example 1.

Comparative properties and results for the uncured compositions containing the ethylene-propylene copolymer and the blends of 50 parts of naphthenic extender oil and 20 parts of polypropylene according to the invention, in relation to the controls containing such ethylene-propylene copolymer and naphthenic extender oil, but no polypropylene, corresponding to control Compositions V and Z of Example 1, are similar to those noted above in Example 1.

In summary, such uncured compositions including the blend of extender oil and polypropylene according to the invention are readily processed, and have good tackiness and reduced nerviness, whereas the corresponding uncured rubber compositions containing no polypropylene and corresponding to controls V and Z of Example 1, are more difficult to process and have poor tack. Further, the incorporation of the polypropylene in solution in the extender oil, into the ethylene-propylene copolymer does not adversely affect the physical properties of the cured rubbers as compared to the physical properties of the cured rubbers formed from the control compositions containing only extender oil and no polypropylene.

EXAMPLE 5

The procedure of Example 1 is substantially carried out by employing in place of the blends B, C and D, the blends H, I and J including aromatic extender oil and amorphous polypropylene.

Results similar to those obtained in Example 1 are observed.

EXAMPLE 6

The procedure of Example 1 is substantially carried out but employing in place of the blends B, C and D, the blends N, O and P including paraffinic extender oil and a mixture of solid amorphous polypropylene (Oronite polypropylene) and liquid amorphous polypropylene (Polypropene C–175).

Results similar to those obtained in Example 1 are observed.

From the foregoing, it is seen that the invention provides novel blends consisting essentially of amorphous polypropylene dissolved in a hydrocarbon extender oil, which have particular value for incorporation in uncured ethylene-propylene rubber formulations to form readily processible formulations, particularly when employing the preferred high molecular weight ethylene-propylene polymers, preferably the terpolymer, while at the same time affording uncured rubber formulations which have substantial tackiness and reduced nerviness, and which are eminently suited for the fabrication of tires. Of further significance, the incorporation of substantial amounts of extender oil and also amorphous polypropylene in the form of a blend of these components, according to the invention, into the uncured ethylene-propylene polymers does not adversely affect the function of the polypropylene as a tackifier for ethylene-propylene copolymer or terpolymer rubber, and such polypropylene additionally functions to reduce the viscosity of the mixture of ethylene-propylene polymer and extender oil. Further, the incorporation of the blends of extender oil and amorphous polypropylene hereof into the ethylene-propylene polymer to form uncured ethylene-propylene rubber formulations, does not degrade the cured rubbers formed from the uncured formulations, and such cured rubbers have good physical properties, including tensile strength, elongation and hardness comparable to rubbers produced in the absence of polypropylene. Also, the use of large proportions of extender oil permitted by employing a blend thereof with the polypropylene, together with the ethylene-propylene polymer, enhances the economics of the system. In addition, the blends of polypropylene and extender oil of the invention are readily adapted for direct addition to the ethylene-propylene polymer to provide directly ethylene-propylene uncured rubber compositions.

While we have described particular embodiments of our invention for the purpose of illustration, it should be understood that various modifications and adaptations thereof may be made within the spirit of the invention and within the scope of the appended claims.

We claim:

1. A composition consisting essentially of a hydrocarbon extender oil for ethylene-propylene rubber and amorphous polypropylene effective to impart substantial tackiness to such rubber, in a proportion of about 5 to about 80 parts of said polypropylene per 100 parts by weight of said extender oil, said extender oil being selected from the group consisting of paraffinic oils having an aniline point range from about 189° F. to about 240° F., naphthenic oils having an aniline point range from about 150° F. to about 250° F., and aromatic oils having an aniline point range from about 100° F. to about 130° F., and said amorphous polypropylene having a molecular weight ranging from about 5000 to about 25,000.

2. A blend consisting essentially of a hydrocarbon extender oil for ethylene-propylene rubber and amorphous polypropylene dissolved in said extender oil and effective to impart substantial tackiness to such rubber, in a proportion of about 5 to about 50 parts of said polypropylene per 100 parts by weight of said extender oil, said extender oil being selected from the group consisting of paraffinic oils having an aniline point range from about 189° F. to about 240° F., naphthenic oils having an aniline point range from about 150° F. to about 250° F. and aromatic oils having an aniline point range from about 100° F. to about 130° F., and said amorphous polypropylene having a molecular weight from about 300 to about 25,000.

3. A composition particularly adapted for addition to an uncured ethylene-propylene rubber for processing thereof, in the form of a solution which consists essentially of a naphthenic extender oil for ethylene-propylene rubber, said extender oil having an aniline point in the range from about 150 to about 250° F., and amorphous polypropylene, said polypropylene having a molecular weight in the range from about 5,000 to about 25,000, in a proportion of about 5 to about 50 parts of said polypropylene per 100 parts by weight of said extender oil.

4. A composition particularly adapted for addition to an uncured ethylene-propylene rubber for processing thereof, in the form of a solution which consists essentially of an aromatic extender oil for ethylene-propylene rubber, said extender oil having an aniline point in the range from about 100 to about 130° F., and amorphous polypropylene, said polypropylene having a molecular weight in the range from about 5,000 to about 25,000, in a proportion of about 5 to about 50 parts of said polypropylene per 100 parts by weight of said extender oil.

5. A composition particularly adapted for addition to an uncured ethylene-propylene rubber for processing thereof, in the form of a solution which consists essentially of a paraffinic extender oil for ethylene-propylene rubber, said extender oil having an aniline point from about 189 to about 240° F., and amorphous polypropylene having a molecular weight in the range from about 5,000 to about 25,000, in a proportion of about 5 to about 50 parts of said polypropylene per 100 parts by weight of said extender oil.

6. A composition consisting essentially of a hydrocarbon extender oil for ethylene-propylene rubber and amorphous polypropylene effective to impart substantial tackiness to such rubber, in a proportion of about 5 to about 80 parts of said polypropylene per 100 parts by weight of said extender oil, said extender oil having an aniline point range from about 150 to about 250° F., said amorphous polypropylene having a molecular weight from about 5000 to about 25,000.

References Cited

UNITED STATES PATENTS

| | | | |
|---|---|---|---|
| 2,190,918 | 2/1940 | Golthel et al. | 196—151 |
| 2,875,170 | 2/1959 | Ayers et al. | 260—33.6 |
| 3,220,966 | 11/1965 | Flanagan | 260—27 |
| 3,132,027 | 5/1964 | Norton et al. | 260—33.6 |
| 3,157,609 | 11/1964 | McNay et al. | 260—33.6 |

FOREIGN PATENTS 964,845  7/1964  Great Britain.

OTHER REFERENCES

G. Alliger et al.: Vulcanization of Elastomers, 1964; Reinhold Publishing Corporation, New York, pp. 311–12 and 316.

ALLAN LIEBERMAN, Primary Examiner

U.S. Cl. X.R.

260—28.5